(12) United States Patent
Connell et al.

(10) Patent No.: US 11,522,900 B2
(45) Date of Patent: Dec. 6, 2022

(54) SYSTEM AND METHOD FOR CYBER SECURITY THREAT ASSESSMENT

(71) Applicant: Cybeta, LLC, Fishers, IN (US)

(72) Inventors: Dane Connell, Fishers, IN (US); Michael Rossi, Fishers, IN (US); Mark Lopes, Fishers, IN (US)

(73) Assignee: Cybeta, LLC, Fishers, IN (US)

( * ) Notice: Subject to any disclaimer, the term of this patent is extended or adjusted under 35 U.S.C. 154(b) by 156 days.

(21) Appl. No.: 16/870,573

(22) Filed: May 8, 2020

(65) Prior Publication Data
US 2020/0358807 A1 Nov. 12, 2020

Related U.S. Application Data

(60) Provisional application No. 62/846,430, filed on May 10, 2019.

(51) Int. Cl.
*H04L 9/40* (2022.01)
*H04L 41/142* (2022.01)
*G06F 16/25* (2019.01)
*H04L 41/12* (2022.01)

(52) U.S. Cl.
CPC ........ *H04L 63/1433* (2013.01); *G06F 16/254* (2019.01); *H04L 41/12* (2013.01); *H04L 41/142* (2013.01); *H04L 63/1425* (2013.01)

(58) Field of Classification Search
CPC . H04L 63/1433; H04L 63/1425; H04L 41/12; H04L 41/142; H04L 41/22; H04L 43/0894; H04L 63/20; G06F 16/254
See application file for complete search history.

(56) References Cited

U.S. PATENT DOCUMENTS

| | | |
|---|---|---|
| 9,294,498 B1 | 3/2016 | Yampolskiy et al. |
| 9,438,615 B2 | 9/2016 | Gladstone et al. |
| D771,695 S | 11/2016 | Yampolskiy et al. |
| 9,680,858 B1 | 6/2017 | Boyer et al. |
| 9,705,932 B1 | 7/2017 | Geil |

(Continued)

FOREIGN PATENT DOCUMENTS

| | | | | |
|---|---|---|---|---|
| CN | 108400895 A | * | 8/2018 | ............ G06N 3/084 |
| CN | 108650133 A | * | 10/2018 | ............ H04L 41/14 |

(Continued)

OTHER PUBLICATIONS

International Bureau of WIPO, International Preliminary Report on Patentability and Written Opinion in International Application No. PCT/US2020/032191 (dated Nov. 25, 2021).

(Continued)

*Primary Examiner* — Sarah Su
(74) *Attorney, Agent, or Firm* — Leydig, Voit & Mayer, Ltd.

(57) ABSTRACT

Embodiments of the disclosure provide a system and method for developing rich data for holistic metrics for gauging an enterprise cyber security posture to enable proactive and preventative measures in order to minimize the enterprise's exposure to a cyberattack. By taking an enterprise-wide holistic approach to cyber security, the enterprise will have information needed to identify areas of its network systems for remediation that will result in making the enterprise a less attractive target for cyber threat actors.

23 Claims, 10 Drawing Sheets

(56) References Cited

U.S. PATENT DOCUMENTS

| | | | |
|---|---|---|---|
| 9,749,353 B1 | 8/2017 | Benskin et al. | |
| 9,807,094 B1 * | 10/2017 | Liu | H04L 63/10 |
| 9,830,569 B2 | 11/2017 | Dahlberg | |
| D818,475 S | 5/2018 | Yepez et al. | |
| 9,973,524 B2 | 5/2018 | Boyer et al. | |
| D819,687 S | 6/2018 | Yampolskiy et al. | |
| 9,992,218 B2 * | 6/2018 | Kompella | H04L 63/1433 |
| 10,084,809 B1 * | 9/2018 | Rambo | G06F 21/50 |
| D835,631 S | 12/2018 | Yepez et al. | |
| 10,176,445 B2 | 1/2019 | Venna et al. | |
| D846,562 S | 4/2019 | Sombreireiro et al. | |
| D847,169 S | 4/2019 | Sombreireiro et al. | |
| 10,257,219 B1 | 4/2019 | Geil et al. | |
| 10,268,976 B2 | 4/2019 | Rasumov | |
| 10,277,620 B2 | 4/2019 | Beale et al. | |
| 10,587,644 B1 | 3/2020 | Stolte et al. | |
| 10,708,291 B2 * | 7/2020 | Findlay | H04L 63/1441 |
| 2004/0003286 A1 | 1/2004 | Kaler et al. | |
| 2005/0018618 A1 | 1/2005 | Mualem et al. | |
| 2012/0246730 A1 | 9/2012 | Raad | |
| 2012/0304300 A1 * | 11/2012 | LaBumbard | G06F 21/577 726/25 |
| 2014/0137257 A1 * | 5/2014 | Martinez | H04L 63/1433 726/25 |
| 2015/0142520 A1 | 5/2015 | Bala et al. | |
| 2016/0028758 A1 | 1/2016 | Ellis et al. | |
| 2016/0226903 A1 * | 8/2016 | Arcamone | H04L 63/1425 |
| 2017/0359220 A1 | 12/2017 | Weith et al. | |
| 2018/0069889 A1 | 3/2018 | Beale et al. | |
| 2018/0083999 A1 | 3/2018 | Cherian | |
| 2018/0124092 A1 | 5/2018 | Pope et al. | |
| 2018/0146004 A1 * | 5/2018 | Belfiore, Jr. | G06F 21/577 |
| 2018/0191770 A1 * | 7/2018 | Nachenberg | G06F 21/554 |
| 2018/0375822 A1 | 12/2018 | Dahlberg et al. | |
| 2019/0034845 A1 | 1/2019 | Mo et al. | |
| 2019/0166150 A1 * | 5/2019 | Bulut | H04L 51/02 |
| 2019/0236661 A1 * | 8/2019 | Hogg | G06Q 30/0282 |
| 2020/0120126 A1 | 4/2020 | Ocepek et al. | |
| 2020/0153863 A1 | 5/2020 | Wiener et al. | |
| 2021/0243223 A1 * | 8/2021 | Arora | H04L 63/1491 |
| 2022/0007195 A1 * | 1/2022 | Shaw | G06N 20/00 |

FOREIGN PATENT DOCUMENTS

| | | | | |
|---|---|---|---|---|
| CN | 109040027 A | * | 12/2018 | H04L 63/1416 |
| WO | WO-2015013376 A2 | * | 1/2015 | H04L 63/1416 |
| WO | WO-2016195644 A1 | * | 12/2016 | G06Q 10/107 |
| WO | WO 2018/044955 A1 | | 3/2018 | |
| WO | WO 2018/132840 A1 | | 7/2018 | |

OTHER PUBLICATIONS

U.S. Patent and Trademark Office, International Search Report in International Application No. PCT/US2020/032191 (dated Aug. 4, 2020).

U.S. Appl. No. 16/870,546, filed May 8, 2020.

* cited by examiner

- First, *Threat Surface* (Ts) is computed    1.70
  - Each IP gets a .025 score
  - Each open port on that IP, gets a .035 score
  - Each technology bound to a port, gets a .064 score
  - Each CVE for a technology, gets a .155 score
  - *Note: Range is 0-2 Ts caps at max 2*

209.59.133.190     .025

80     .07 jQuery 1.5.2         IIS 5.2         Apache 2.4     .20

CVE-2017-1593   2.3    CVE-2017-4344   2.4    CVE-2017-6587   4.5    1.40
               CVE-2018-2052   10.0    CVE-2019-6432   4.5    CVE-2018-7977   5.4
               CVE-2019-9568   3.4     CVE-2019-9687   9.4    CVE-2019-5059   10.0
               (2.3+10.0+3.4) /2    (2.4+4.5+9.4) /2    (4.5+5.6+10.0) /2
                 7.41              7.42              8.32

- *Vulnerability Score* (Vs) is computed    8.05
  - Weighted vulnerability score for all published vulns reflects vulnerability of technologies on any active IP:Port
  - *Vuln score(s) range from 0-10*

Authentication required: none    3.33
                            Complexity of exploit: low       3.33
                            Attack Vector: remote            3.33
                                                              9.99

Authentication required: none    3.33
                            Complexity of exploit: medium   2
                            Attack Vector: remote            1
                                                              6.33

Authentication required: none    3.33
                            Complexity of exploit: low       3.33
                            Attack Vector: local             1
                                                              7.66

- *Attack Likelihood* (Al) is computed    8.99
  - Critical characteristics of vulnerabilities are analyzed to score the ease of attackers exploiting a vuln
  - *Calculation ensures range of 0-10*

| Attack Vector | | Complexity | | Authentication | |
|---|---|---|---|---|---|
| Local | 1 | High | 1 | Multiple-instances | 1 |
| Adjacent Network | 2 | Medium | 2 | Single-instance | 2 |
| Network | 3.33 | Low | 3.33 | None | 3.33 |
| Not defined | 0 | Not defined | 0 | Not defined | 0 |

- *Threat Beta™* (Tb) combines these values    1.71
  - (Ts + Vs + Al) * .091

FIG. 9

SYSTEM AND METHOD FOR CYBER SECURITY THREAT ASSESSMENT

CROSS-REFERENCE TO RELATED APPLICATIONS

This patent application claims the benefit of U.S. Provisional Patent Application No. 62/846,430, filed May 10, 2019, which is incorporated by reference.

FIELD

Embodiments disclosed herein generally relate to cyber security, and more particularly to a cyber security threat assessment based on a device-level quantification of exposure, relative vulnerability, and likelihood of attack.

BACKGROUND

Cyber security is the protection of network connected systems, including hardware, software and data from cyberattacks. An enterprise, such as a corporation, not-for-profit organization or other such entity, typically owns, deploys and manages network connected systems. These network connected systems typically run one or more different technologies in order to enable a benefit for the enterprise such as collecting, organizing and analyzing data or operating infrastructure or other such actions relevant to the enterprise.

Because of the benefit these network connected systems provide to the enterprise, an attack on the system, such as a cyberattack, can be detrimental to the operations of the enterprise. For example, a bank stores financial data related to its customers. If this data were obtained by a bad actor during a cyberattack, the bank would be exposed to potential liability to its customers and almost certain reputational damage that would affect shareholder value of the bank.

Historically, to protect against a cyberattack, certain vulnerability data for the different technologies operating within network connected systems of an enterprise would be collected and analyzed for various insights. This typically entailed repacking the already known vulnerability data into various charts and graphs without providing any further insights regarding the network of the enterprise as a whole. Accordingly, what is needed is a more granular and holistic approach that provides a cyberattack threat assessment for a network connected system of an enterprise.

BRIEF SUMMARY OF THE INVENTION

In a particular embodiment, a method for predicting cyber security risk performed by a cyber security risk prediction server, the method comprising: collecting network parameters of a network associated with an enterprise at risk from cyber security threats; collecting threat intelligence data from a plurality of data sources external to the enterprise at risk from cyber security threats; performing an Extract, Transform and Load (ETL) from one or more databases based on the network parameters to obtain relevant threat intelligence data, wherein the one or more databases store the threat intelligence data from the plurality of data sources external to the enterprise at risk from cyber security threats, and the relevant threat intelligence data is data stored in the one or more databases that is relevant to the network parameters; and analyzing the relevant threat intelligence data to obtain a predicted threat assessment for the enterprise at risk from cyber security threats.

In another embodiment, a system for predicting cyber security risk, the system comprising: a cyber security risk prediction server configured to: collect network parameters of a network associated with an enterprise at risk from cyber security threats; collect threat intelligence data from a plurality of data sources external to the enterprise at risk from cyber security threats; perform an Extract, Transform and Load (ETL) from one or more databases based on the network parameters to obtain relevant threat intelligence data, wherein the one or more databases store the threat intelligence data from the plurality of data sources external to the enterprise at risk from cyber security threats, and the relevant threat intelligence data is data stored in the one or more databases that is relevant to the network parameters; and analyze the relevant threat intelligence data to obtain a predicted threat assessment for the enterprise at risk from cyber security threats.

In yet another embodiment, a non-transitory computer-readable medium containing computer executable instructions for predicting cyber security risk, the computer readable instructions, when executed by a computer, cause the computer to perform steps comprising: collecting network parameters of a network associated with an enterprise at risk from cyber security threats; collecting threat intelligence data from a plurality of data sources external to the enterprise at risk from cyber security threats; performing an Extract, Transform and Load (ETL) from one or more databases based on the network parameters to obtain relevant threat intelligence data, wherein the one or more databases store the threat intelligence data from the plurality of data sources external to the enterprise at risk from cyber security threats, and the relevant threat intelligence data is data stored in the one or more databases that is relevant to the network parameters; and analyzing the relevant threat intelligence data to obtain a predicted threat assessment for the enterprise at risk from cyber security threats.

In a particular embodiment, a method for providing a holistic cyber security risk prediction metric for an enterprise network associated with an enterprise at risk from cyber security threats, the method comprising: identifying enterprise network parameters of the enterprise network associated with the enterprise at risk from cyber security threats; collecting vulnerability data associated with the enterprise network parameters, the vulnerability data comprising vulnerability scoring data and exploit severity data; determining one or more component cyber security threat scores based on the enterprise network parameters, the vulnerability scoring data, and the exploit severity data; and determining a holistic cyber security risk score for the enterprise at risk from cyber security threats based on the one or more component cyber security threat scores.

In another embodiment, a system for providing a holistic cyber security risk prediction metric for an enterprise network associated with an enterprise at risk from cyber security threats, the system comprising: a cyber security risk prediction server configured for: identifying enterprise network parameters of the enterprise network associated with the enterprise at risk from cyber security threats; collecting vulnerability data associated with the enterprise network parameters, the vulnerability data comprising vulnerability scoring data and exploit severity data; determining one or more component cyber security threat scores based on the enterprise network parameters, the vulnerability scoring data, and the exploit severity data; and determining a holistic cyber security risk score for the enterprise at risk from cyber security threats based on the one or more component cyber security threat scores.

In yet another embodiment, a non-transitory computer-readable medium containing computer executable instructions for providing a holistic cyber security risk prediction metric for an enterprise network associated with an enterprise at risk from cyber security threats, the computer readable instructions, when executed by a computer, cause the computer to perform steps comprising: identifying enterprise network parameters of the enterprise network associated with the enterprise at risk from cyber security threats; collecting vulnerability data associated with the enterprise network parameters, the vulnerability data comprising vulnerability scoring data and exploit severity data; determining one or more component cyber security threat scores based on the enterprise network parameters, the vulnerability scoring data, and the exploit severity data; and determining a holistic cyber security risk score for the enterprise at risk from cyber security threats based on the one or more component cyber security threat scores.

BRIEF DESCRIPTION OF THE DRAWINGS

FIG. 9 illustrates an example calculation of the holistic cyber security risk prediction metric, according to an embodiment of the disclosure.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Embodiments of the disclosure provide a rich data for developing holistic metrics for gauging an enterprise cyber security posture to enable proactive and preventative measures in order to minimize the enterprise's exposure to a cyberattack. By taking an enterprise-wide holistic approach to cyber security, the enterprise will have information needed to identify areas of its network systems for remediation that will result in making the enterprise a less attractive target for cyberthreat actors.

Turning to the drawings, and as described in greater detail herein, embodiments of the disclosure provide methods and systems to provide a holistic enterprise wide cyber security threat assessment.

Figure 1:
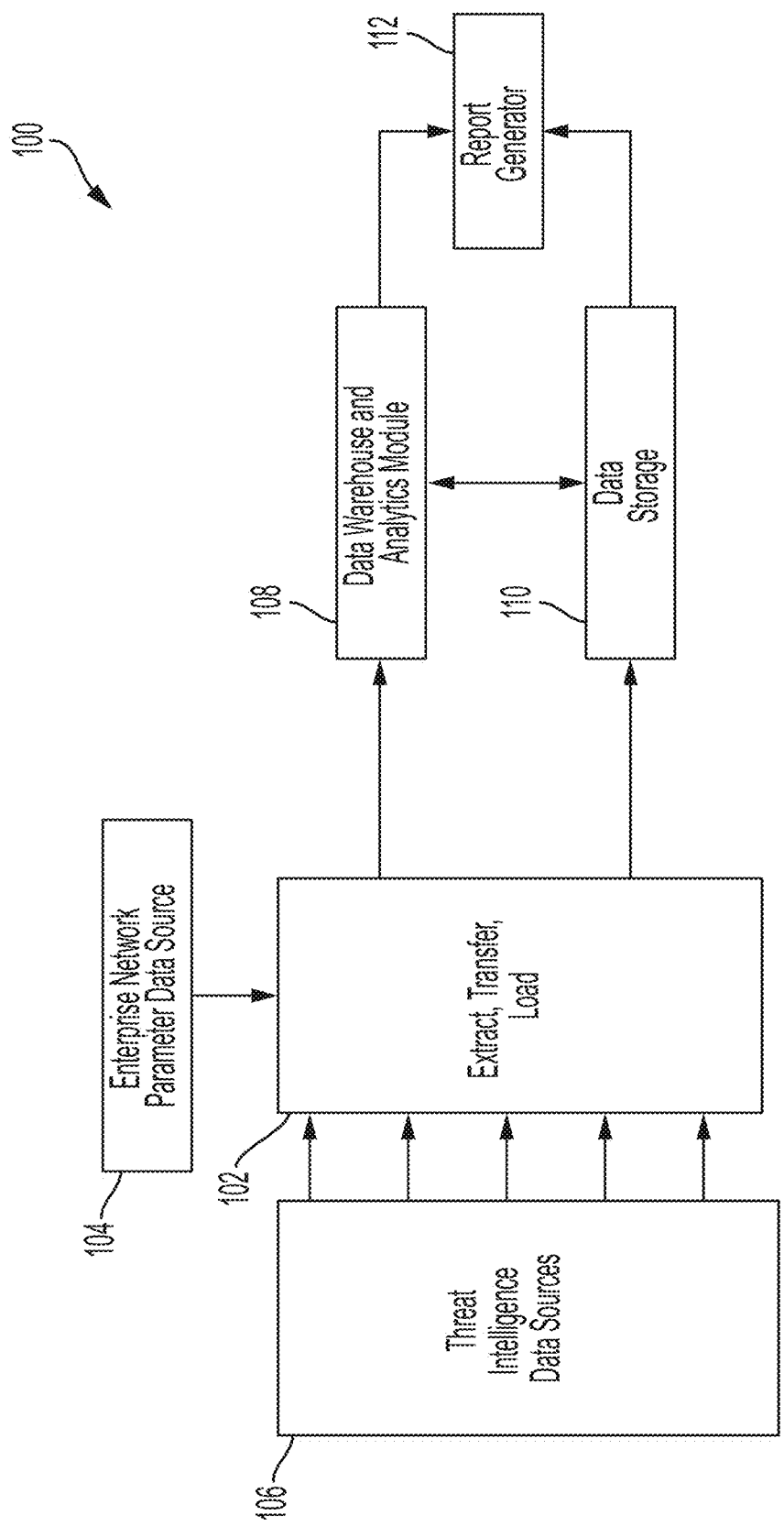
FIG. 1 is a block diagram showing functional components of a system for cyber security threat assessment, according to an embodiment of the disclosure.

FIG. 1 illustrates block diagram showing functional components of a cyber security threat assessment system 100, according to an embodiment of the disclosure. The cyber security threat assessment system 100 includes an Extract, Transform, Load (ETL) function block 102, an enterprise network parameter data source 104, threat intelligence data sources 106, a data warehouse and analytics system 108, a data storage 110 and a report generator 112.

The ETL 102 performs a variety of functions within the cyber security threat assessment system 100. One such function it performs is extracting data from data sources. In the illustrated embodiment, the data sources include the enterprise network parameter data source 104 and the threat intelligence data sources 106.

The enterprise network parameter data source 104 stores data relevant to network systems of a particular target enterprise, such as a corporation or other such enterprise that may be the target of malicious cyber actors. This data may include a Top Level Domain (TLD) of the enterprise and any associated Autonomous System Numbers (ASNs), Internet Protocol (IP) Addresses associated with the TLD, any port numbers associated with the IP Addresses, types of technology associated with the IP Addresses, enterprise network hostnames and subdomains, types of network equipment in the enterprise network, a network location of the types of network equipment, a geographic location of the types of network equipment, exposure to third party networks in the network associated with the enterprise, and any such other network information associated with the target enterprise.

The threat intelligence data sources 106 provide data external to the target enterprise yet still relevant to the enterprise network. This threat intelligence data may include dark web data; technology vulnerability data; deep web data; upstream, downstream and peer network threats; data from hacker discussion boards; changes to behavioral Tactics, Techniques and Procedures (TTP); global internet infrastructure vulnerabilities; vulnerabilities in supply chain networks for the enterprise; technical capabilities, tactics, techniques and history of a hacker or group of hackers and any such other threat intelligence data external to the network of the target enterprise yet still relevant that network.

The ETL 102 further performs a transform function to the data from the enterprise network parameter data source 104 and data from the threat intelligence data sources 106. This transform function forms the data into relevant threat intelligence data useable within the cyber security threat assessment system 100. The ETL 102 then loads the relevant threat intelligence data into a data warehouse and analytics system 108 and also into a data storage database 110.

The data warehouse and analytics module 108 analyzes the relevant threat intelligence data to produce various enterprise metrics regarding cyber security of the target enterprise network. These enterprise metrics may include a holistic threat assessment score representing an overall risk level to the enterprise, individual threat rating score for each type of technology utilized within the enterprise network, various potential financial losses attributable to a potential cyber attack including losses attributable per technology and an overall enterprise loss, and a technology heat map that provides a geographic representation of cyber threats for the enterprise. In certain embodiments, the holistic threat assessment score for the target enterprise is normalized against a plurality of other enterprises also at risk of a cyber attack.

The data warehouse and analytics module 108 passes the various metrics it develops to the report generator 112. The report generator 112 allows the cyber security threat assessment system 100 to generate a threat assessment report that provides the various metrics to interested parties in a report format. The report may include various metrics and graphical depictions of the various metrics allowing for convenient review by the interested parties.

As mentioned above, the ETL 102 also loads the relevant threat intelligence data into the data storage 110. The data storage 110 is configured to share its data with the data warehouse and analytics system 108 and the report generator 112.

Figure 2:
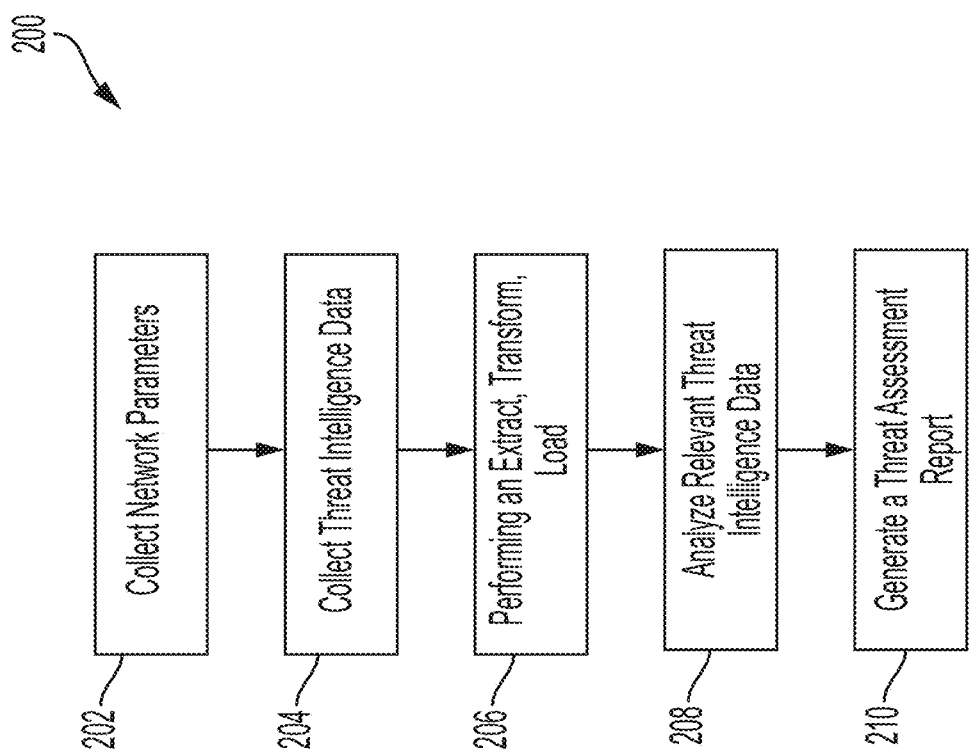
FIG. 2 is a flow chart illustrating a cyber security threat assessment process performed by the system of FIG. 1, according to an embodiment of the disclosure.

FIG. 2 illustrates a flow chart of a cyber security threat assessment process 200 performed by the cyber security threat assessment system 100, in accordance with an embodiment of the disclosure. At step 202, the cyber security threat assessment system 100 collects network parameters of the target enterprise network, and at step 204, the system 100 collects threat intelligence data from the threat intelligence data sources. The collected data is stored in one or more databases for subsequent use by the cyber security threat assessment system 100. In certain embodiments, the cyber security threat assessment system 100 utilizes one or more automated passive scanners to collect the data in step 202.

At step 206, the cyber security threat assessment system 100 performs an ETL from the one or more databases based on the network parameters to obtain relevant threat intelligence data. At step 208, the cyber security threat assessment system 100 analyzes the relevant threat intelligence data to obtain the various cyber security threat metrics discussed in relation to FIG. 1, and, at step 210, the cyber security threat assessment system 100 generates a threat assessment report for the target enterprise.

Figure 3:
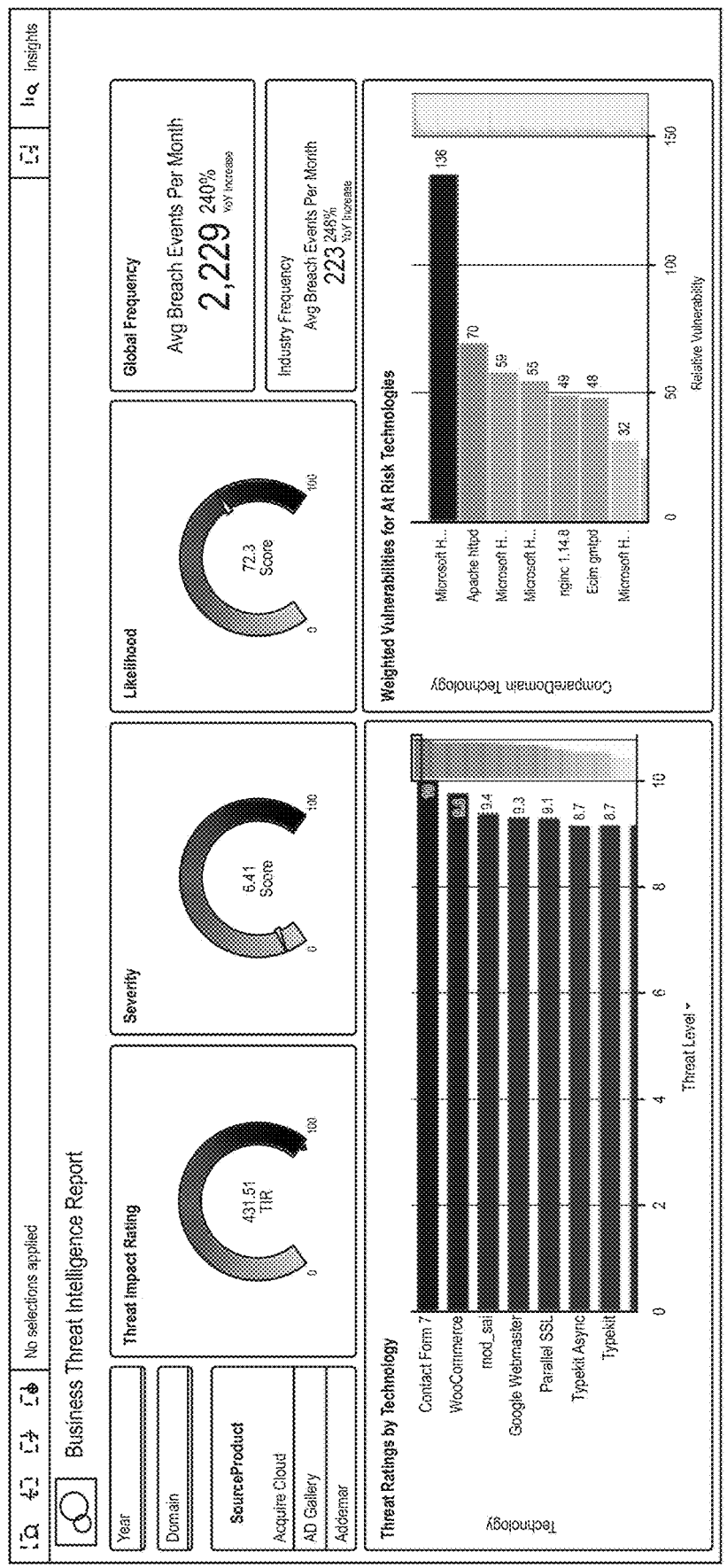
FIGS. 3-6 illustrates a cyber security threat assessment report generated by the system of FIG. 1, according to an embodiment of the disclosure.

FIGS. 3-6 illustrate aspects of a cyber security threat assessment report generated by the cyber security threat assessment system 100, in accordance with an embodiment of the disclosure. FIG. 3 provides a variety of metrics useful for making cyber security decisions for an enterprise. For instance, FIG. 3 provides a global frequency of cyber security events per month and also an industry frequency of cyber security events per month for a particular industry, such as the financial industry. The aspects of the report shown in FIG. 3 also provide a Threat Rating by Technology section providing an individual threat rating score for each type of technology used by the target enterprise at risk. Similar information is provided under a Weighted Vulnerability for At Risk Technologies section that provides a relative vulnerability score to identify the most at risk technologies used within the target enterprise. All of this information is then also used to develop threat metrics, including a Threat Impact Rating (TIR) or Threat Beta, a Severity score, and a Likelihood score providing a likelihood of an attack on the target enterprise.

Figure 4:
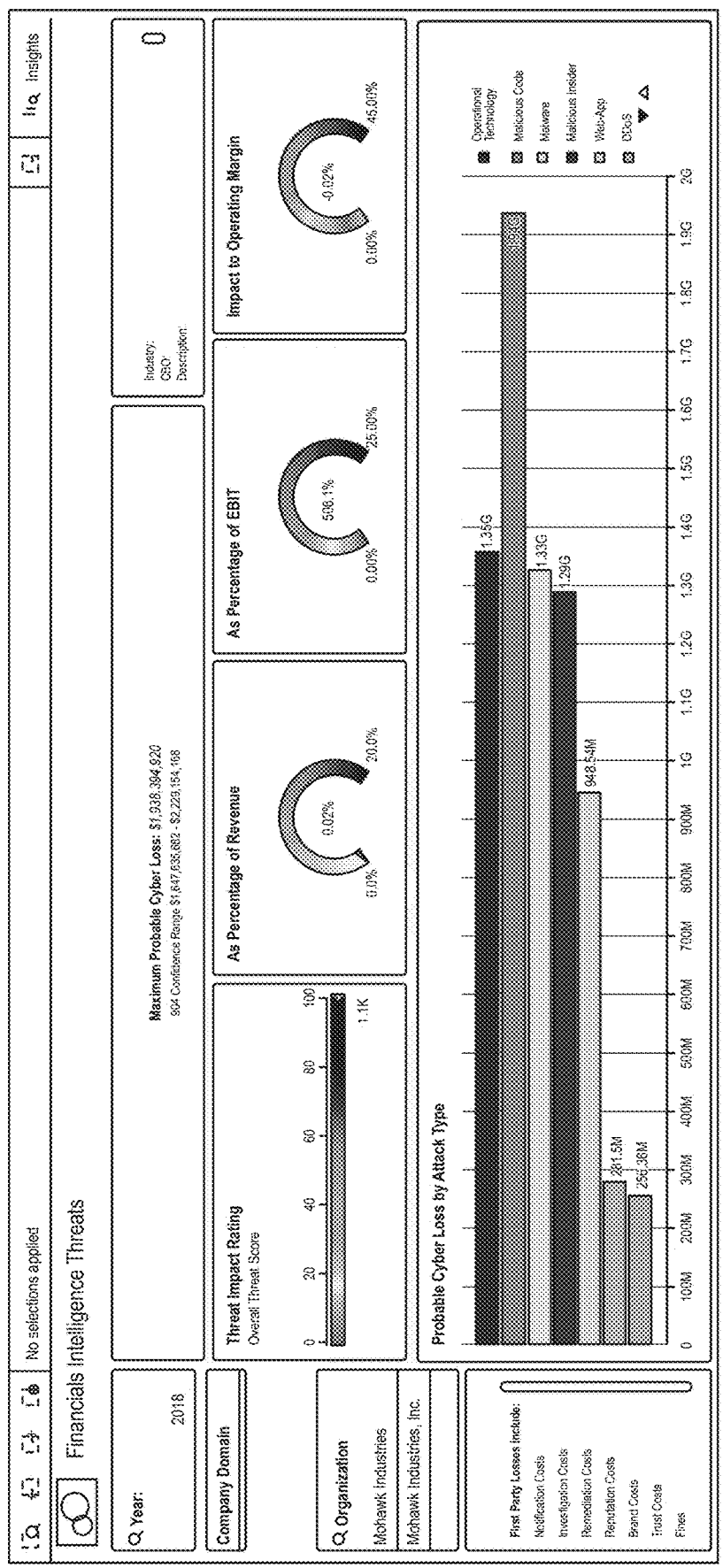

FIG. 4 illustrates a financial analysis attributable to a potential cyber attack on the target enterprise. This aspect of the report provides a Maximum Probable Cyber Loss value, which assigns a total financial cost to the target enterprise attributable to a cyber attack that would be the most costly to the enterprise. This total financial cost is determined by taking the highest cost attack from a Probable Cyber Loss by Attack Type section that assigns a probable loss based on a type of cyber attack. This section lists several types of cyber attacks, including an attack on Operational Technology, Malicious Code, Malware, Malicious Insider, Web Application, and a Distributed Denial-of-Service (DDoS) attack.

Figure 5:
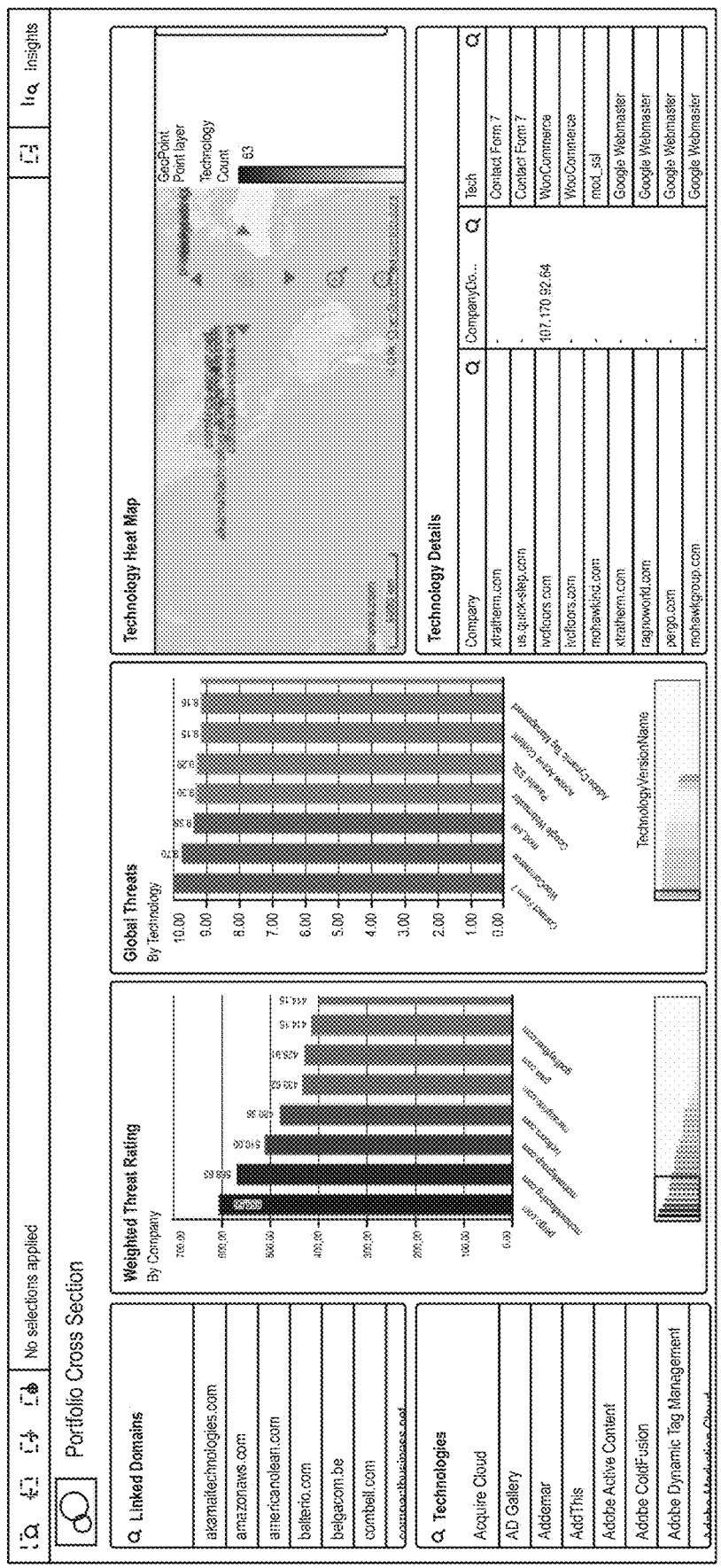

FIG. 5 provides a cyber threat global map for cyber threats against particular technologies. This aspect of the report provides a Technology Heat Map. The heat map provides a location of certain types of threats based on the type of technology the threat is directed toward. This aspect also provides a number of Global Threats per technology and a Weighted Threat Rating, which shows enterprises most at risk based on the technologies they utilize.

Figure 6:
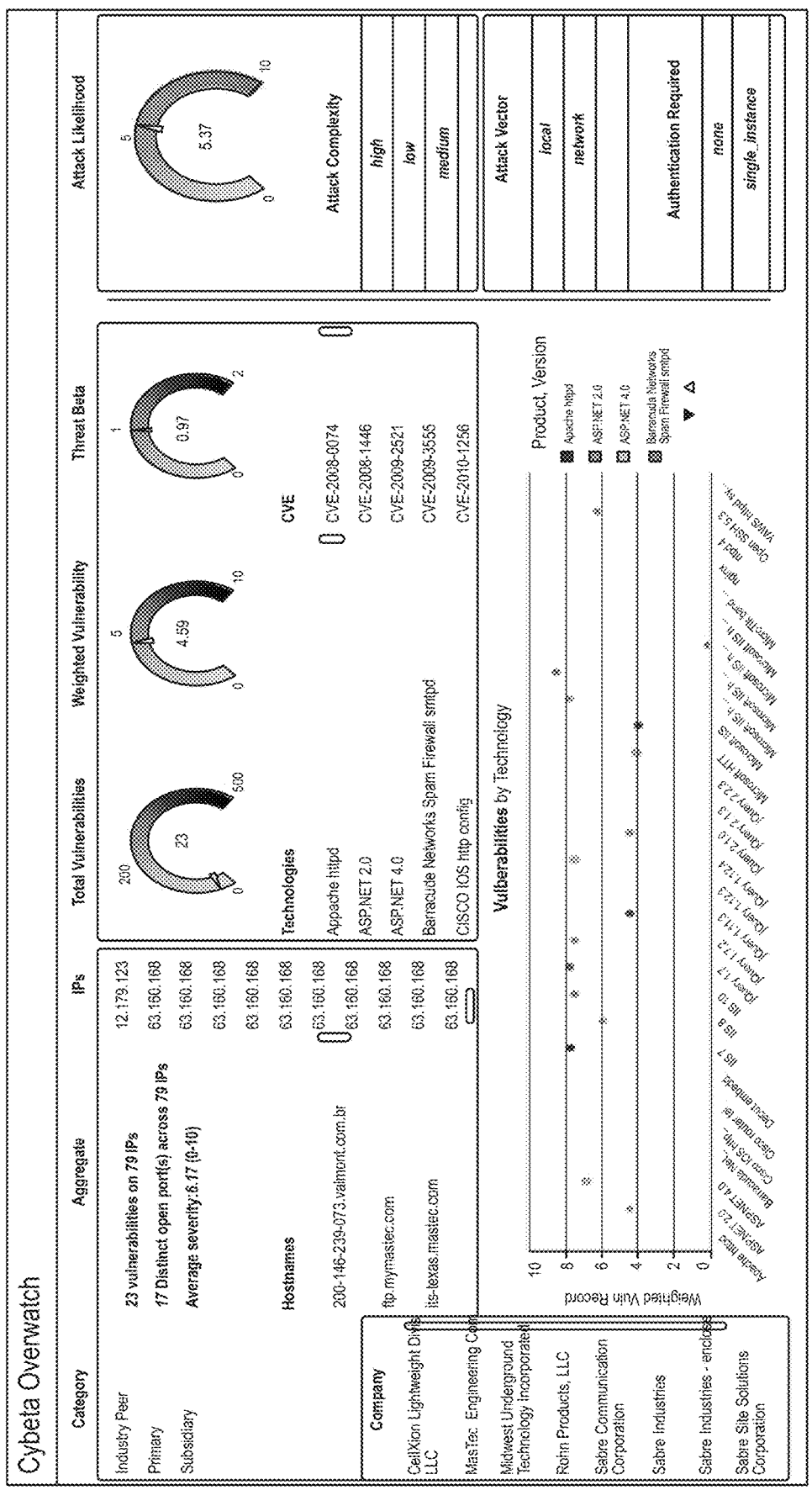

FIG. 6 illustrates a Threat Beta score, which is a singular holistic and predictive threat assessment score relevant to the target enterprise as a whole. The Threat Beta score is accompanied by other constituent data utilized to determine the score. This includes an Attack Likelihood that provides a metric to determine how likely it may be for the target enterprise to experience a particular threat. The Attack Likelihood is based on a complexity of a particular attack, an attack vector such as whether the attack is local or remote, and whether authentication is required to access the particular technology associated with the threat. FIG. 6 also provides metrics based on technology vulnerabilities by providing a Weighted Vulnerabilities score and a Total Vulnerabilities score providing a total number of potential vulnerabilities based on technologies used at the target enterprise.

Figure 7:
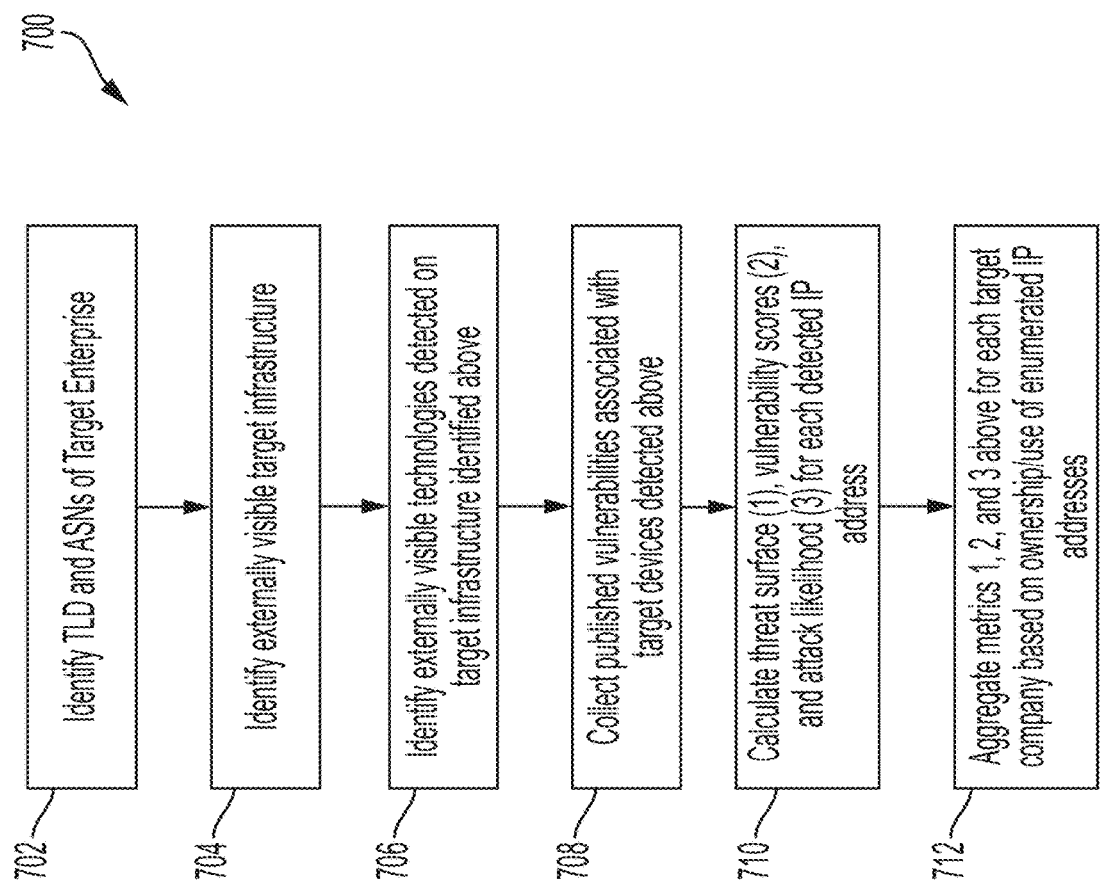
FIG. 7 illustrates a flow chart for providing a holistic cyber security risk prediction metric, according to an embodiment of the disclosure.

FIG. 7 illustrates a flow chart 700 for providing a holistic cyber security risk prediction metric such as the above mentioned Threat Beta, according to an embodiment of the disclosure. In certain embodiments, this holistic metric may be determined by a cyber security threat assessment system 100, as provided in FIG. 1.

Steps 702 and 704 broadly represent identifying enterprise network parameters of the target enterprise. In certain embodiments, identifying enterprise network parameters of the target enterprise means identifying a Top-Level Domain (TLD) and any associated Autonomous System Numbers (ASNs) of the target enterprise, at step 702, and, at step 704, identifying externally visible target enterprise network infrastructure based on the TLD and ASNs. In certain embodiments, the target enterprise network infrastructure may include hostnames and subdomains associated with the TLD, IP addresses associated with the TLD/ASNs, and port numbers for each of the IP addresses.

After identifying the target enterprise network infrastructure, at step 706, the cyber security threat assessment system 100 (see FIG. 1) identifies externally visible technologies detected on the target infrastructure. This includes identifying types of technologies running on each of the IP addresses, and port numbers to which the technologies are bound for each of the IP addresses.

In certain embodiments, the enterprise network parameters, the externally visible target enterprise network infrastructure and externally visible technologies identified in steps 702, 704 and 706 are collected by a scanner, such as an automated passive scanner. Once the information is gathered by the scanner, it may be stored in one or more databases, such as the Enterprise Network Parameter Data Source 104 (see FIG. 1). For example, in a particular embodiment, once a target enterprise is found, a TLD for that target enterprise may be is scanned by one or more automated passive scanners in order to gather the enterprise network parameters, the externally visible target enterprise network infrastructure and externally visible technologies that are in turn stored in one or more databases, such as the Enterprise Network Parameter Data Source 104 for identification and subsequent analysis performed by the cyber security threat assessment system 100.

After identifying the externally visible technologies detected on the target enterprise network infrastructure, at step 708, the cyber security threat assessment system 100 (see FIG. 1) collects vulnerability data associated with each of the identified and collected technologies running on each of the IP addresses. In certain embodiments, the vulnerability data is collected from the Threat Intelligence Data Sources 106. In certain embodiments, vulnerability data includes vulnerability scoring metadata provided by an industry standard such as First.org that provides enumerated vulnerability scoring for particular technologies that may be used by the target enterprise. The enumerated vulnerability scoring may include Common Vulnerability Enumeration (CVE) and Common Vulnerability Scoring System (CVSS) data, which also includes exploit severity metadata.

In certain embodiments, vulnerability data further includes cyber threat actor technical capability data. For each vulnerability identified from the technologies detected on the target enterprise network infrastructure, a technical exploit capability is assessed. The technical exploit capability provides a list of known cyber threat actors with the technical capability and patterns of behavior for exploiting that particular vulnerability.

At step 710, one or more component cyber security threat scores are determined for each IP address of the target enterprise network. In certain embodiments, the one or more component cyber security threat scores are three component scores based on the collected enterprise network infrastructure, the vulnerability scoring data, and the exploit severity data. These scores may be referred to as a Threat Surface, a Vulnerability Score, and an Attack Likelihood, as shown in FIG. 6. The Threat Surface component score is determined based on the collected enterprise network infrastructure including the number of distinct technologies detected, the number of distinct port numbers open on each of the IP addresses, and the number of published vulnerabilities (CVEs) associated with detected technologies. The Vulnerability Score component is determined based on the vulnerability scoring data for each of the technologies, such as the CVE and CVSS data, and the Attack Likelihood component score is determined based on the exploit severity metadata provided in the CVSS data related to technology vulnerability. The exploit severity metadata typically includes various types of data describing aspects of the technology vulnerability, such as a complexity of a particular attack, an attack vector such as whether the attack is local or remote, and whether authentication is required to access the particular technology associated with the vulnerability.

At steps 710 and 712, the cyber security threat assessment system 100 (see FIG. 1) determines the holistic cyber security risk score, such as Threat Beta (see FIG. 6), based on the one or more component cyber security threat scores. Specifically, at step 710, the cyber security threat assessment system 100 determines individual IP address threat scores (an IP address specific Threat Beta) based on a combination of the Threat Surface, the Vulnerability Score, and the Attack Likelihood for each of the IP addresses of the target enterprise. Finally, to determine the holistic cyber security risk score (overall Threat Beta) for the target enterprise, at step 712, the cyber security threat assessment system 100 aggregates the individual IP address threat scores.

In certain embodiments, the holistic cyber security risk score for the target enterprise determined at step 712 may be modified by weighting the score further based on the technical exploit capability data. Specifically, the various vulnerabilities that contribute to the score for the target enterprise will have an associated list of potential cyber threat actors with the technical capability to exploit that particular vulnerability. The score may then be adjusted based on whether the associated cyber threat actors have the capability, patterns of behavior and a desire to gain access to the data and information of the target enterprise. For instance, a state sponsored cyber threat actor may be primarily interested in certain types of data that would be unique from a non-state sponsored (or private) cyber threat actor. Generally, a state sponsored cyber threat actor may not be as interested in, or have historical attack activity against, user credit card information as a private cyber threat actor. Accordingly, in a situation where only state sponsored cyber threat actors have the capability to exploit a vulnerability associated with a system that protects financial information such as credit card numbers, the holistic score may be decreased to represent a decrease in concern that the vulnerability will be exploited. Alternatively, the holistic score may increase in a situation where the vulnerability is capable of being exploited by a cyber threat actor that is also interested in the protected data.

Figure 8:
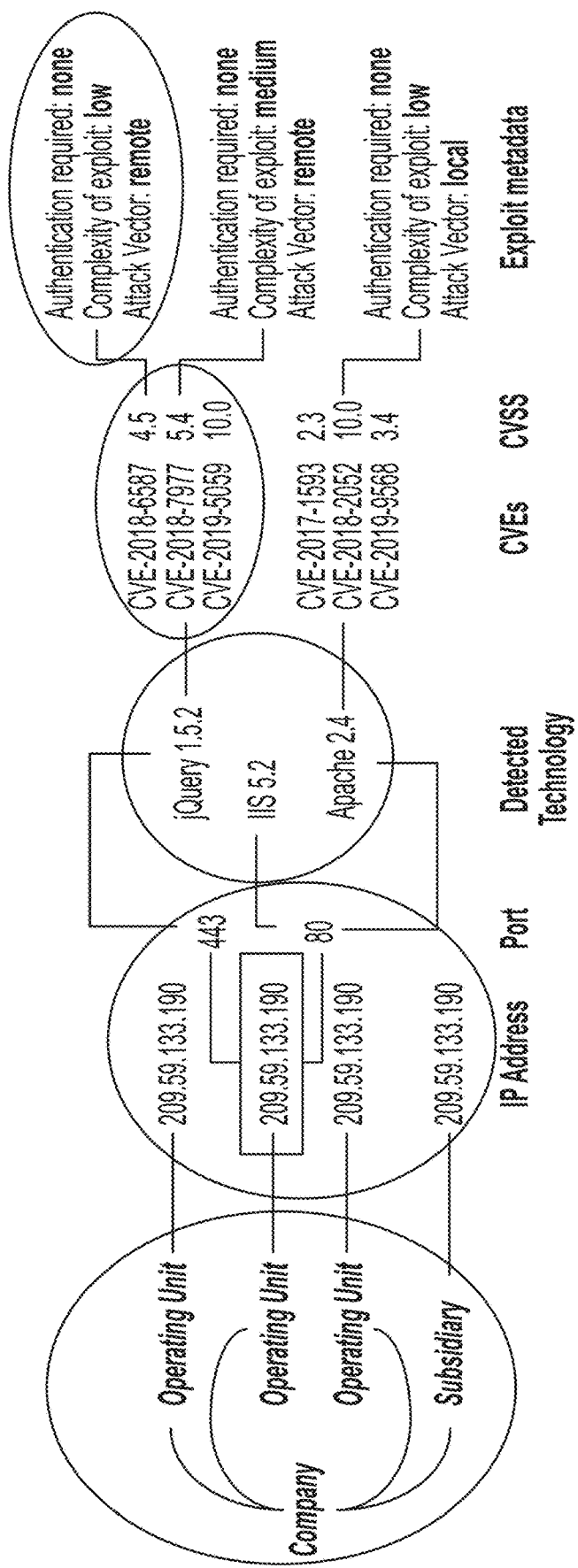
FIG. 8 illustrates an example enterprise network infrastructure and related vulnerability data, according to an embodiment of the disclosure.

FIGS. 8 and 9 illustrate an example of the process for determining the holistic cyber security risk score for a target enterprise. FIG. 8 illustrates the collection of the enterprise network parameters and vulnerability data associated with an individual IP address of the target enterprise. Specifically, the target enterprise, referred to as Company and its many Operating Units and Subsidiary in the illustrated example, are analyzed and IP addresses are identified. For readability, the collected data is only being shown for a single IP address 209.59.133.190. However, in practice, the process performed for this single IP address is performed for all IP addresses of the Company.

For the single IP address 209.59.133.190, each associated port is obtained along with technologies bound to those ports. In the illustrated embodiment, this includes ports 443 and 80, with port 443 including technology jQuery 1.5.2 and port 80 including technologies ISS 5.2 and Apache 2.4. For each technology, the vulnerability CVE, CVSS, and exploit severity metadata is collected.

FIG. 9 illustrates an exemplary computation of the Threat Surface (Ts), the Vulnerability Score (Vs), and the Attack Likelihood (Al) component cyber security threat scores for the single IP address 209.59.133.190. In computing Ts, each IP address receives a 0.025 score, each open port on the IP address receives a 0.035 score, each technology bound to a port gets a 0.064 score, and each CVE for a technology gets a 0.155 score. Each of these scores are added together for the single IP address to receive a Ts score of 1.70 for the illustrated example. In general, Ts will typically have a range of 0-2, and in certain embodiments is hard capped at a maximum value of 2.

Vs is computed by finding a weighted vulnerability score for all published vulnerabilities. Vs reflects vulnerability of technologies on any active IP/port and typically ranges from 0-10. In the illustrated example, individual vulnerability scores are calculated for each technology on the IP address. In certain embodiments, this is accomplished by utilizing a weighting formula that appropriately weights published vulnerability scores of each technology. In the illustrated embodiment, the weighting formula includes, for each distinct technology detected and bound to an IP:Port combination, the Vs is an average CVSS score for all CVEs, plus the highest CVSS score, and that total is divided by 2. In this weighting formula, the maximum weighted Vs cannot exceed 10, which is a high end of the CVSS score range. As shown in the illustrated embodiment, the weighted score between the jQuery 1.5.2, ISS 5.2 and Apache 2.4 technologies is 8.05.

Al is computed by reviewing aspects of each CVE for each technology. Specifically, for each individual CVE for a technology, a score is determined based on reviewing the exploit severity metadata. In certain embodiments, the exploit metadata includes the following elements: Attack Vector (from where can the attack be exploited), Complexity (how difficult is it to implement an exploit), and Authentication (what credentials or log-ins are required to exploit the vulnerability). When no information is available for a CVE, the value of each component is "Not defined." For each component, the scoring ascends as the degree of risk and vulnerability increases.

In the illustrated embodiment, Attack Complexity scoring is as follows:
- a vulnerability that is "Low" can be considered to be "easy" to execute a successful exploit, so it is scored the highest with a 3.33;
- a medium difficulty exploit is weighted as a 2; and
- an exploit with High complexity (a relatively difficult exploit) receives the lowest value of a 1.

In the illustrated embodiment, Attack Vector scoring is as follows:
- an attack that requires local access is more difficult for a bad actor to implement, and therefore, less likely to occur so it is scored as a 1;
- an attack that requires access from at least an adjacent network to the target network is slightly less difficult that the local access, and therefore, it is scored as a 2; and
- an attack that requires only network access to the target network is the least difficult, and therefore, it is scored as a 3.33.

In the illustrated embodiment, Authentication scoring is as follows:
- a target network technology requiring multiple instances of authentication are more secure and scored lower with a 1;
- a target network technology requiring a single instance of authentication is less secure and scored higher with a 2; and
- a target network technology that requires no authentication is the least secure and scored highest with a 3.33.

In general, attack likelihood components represent a quantification of the likelihood that a given CVE can in fact be exploited. As shown above and in FIG. 9, each of these individual pieces of metadata are assigned a score based on the actual data and then summed together to arrive at an individual score for each CVE. Each CVE score is weighted to arrive at an Al score for each technology, and those Al scores for each technology are weighted to arrive at an Al score for the IP address, which in the illustrated embodiment is 8.99. Typically, Al ranges between 0-10. For example, an Al score of 10 could be calculated for a given CVE if that vulnerability exploit is of low complexity (easy to exploit), can be exploited remotely (does not require physical access to the device), and does not require authentication to implant or trigger the exploit.

Once each of Ts, Vs, and Al are determined for each IP address they are summed together and multiplied by a normalization factor to arrive at a cyber security threat score for the IP address. In the illustrated embodiment shown in FIG. 9, the normalization factor is 0.091. This is performed for each IP address identified as part of the target enterprise to arrive at the holistic cyber security threat score for the target enterprise, such as Threat Beta shown in FIG. 6.

The normalization factor is a calibration factor used to establish a norm, or median score as the cyber security threat score for each IP address is a metric designed to show a deviation from a norm. In establishing a range of scores and a median, survey samples were made from companies across all industry classifications as established by the industry standard Global Industry Classification Standard (GICS).

In the illustrated embodiment, the normalization factor of 0.091 was used to calibrate the algorithm to match the median metric when viewed across a statistically significant survey of representative companies across all GICS classifications. Periodically, the survey is repeated to discern if recalibration is necessary due to new technologies, the relative state of cyber security preparedness across industries, or other substantive developments that may affect a target enterprise's information technology ecosystems.

In general, the holistic enterprise level cyber threat score (Threat Beta), as shown in FIG. 6, is a metric that ranks company technologies identified in a passive scan of externally-facing resources. There exists a portfolio version of Threat Beta that accumulates the set of technologies found in the passive scan. This company Threat Beta portfolio metric represents an aggregate set of individual technology Threat Betas.

This Threat Beat portfolio metric is determined as follows:
For each i in 1 . . . n calculate:

$$\beta_i = f_5(f_1(\pi,\delta), f_2(\chi,\zeta), f_3(\xi), f_4(\Delta))/\text{norm factor} \quad (1)$$

Variables:
n=number of technologies found in passive scan
β=Port Dynamics
π=Count of IP:Ports that the technology appears
χ=Technologies Vulnerability Score Estimate
ζ=Joint probabilities other technologies present
ξ=CVE Exploit DB entries
Δ=Dark Mentions
norm factor normalizes the mean value β of 1.0

The individual $\beta_i$ components each represent an individual technology Threat Beta and are summed as follows to achieve the holistic portfolio metric:

$$\hat{\beta} = \frac{\sum_{i=1}^{n} \beta_i * \pi_i}{\sum_{i=1}^{n} \pi_i} \quad (2)$$

(a weighted average that is normalized for the population mean β)

From passive scans of an organization's externally-facing technologies, the Threat Beta for each technology is created using the number of IP:Ports a technology appears on and the CVE and CVSS scores for that technology. When developed by looking at a company's technology that shows in passive scans from the internet, the list of technologies can be small, even non-existent or it can be very large.

The calculation of Threat Beta by technology in equation (1) above is a function of the data collected in the passive scan, known technology vulnerabilities, observed dark web mentions for the technology and documented technology exploits. As you can see from the function definition of Threat Beta by technology, there are four functions that make up the calculation. The first function considers the count of the number of IP:Ports and Port Dynamics (web statistics on ports). The second function considers technology vulnerability scores (CVE and CVSS Base Scores) and CVE joint probabilities for technology pairing as it is related to other technologies identified in the scan. The third function is the technologies appearance in known exploit databases, such as on Exploit DB. The final function considers the rate of Dark Mentions for a technology.

The first function, $f_2$ ($\chi$, $\delta$), considers the count of the number of IP:Ports and Port Dynamics increases as the number of IP:Port combinations increases. This reflects a level of exposure or surface area for a technology. Basically, how many ports are showing for a technology. The more ports, the more risks are exposed. Port dynamics (SANS) tracks the relative rate of inquiries to a port number. If a port number is being inquired for at a higher rate than is expected there is a penalty applied to the port number. This captures the weight on a port for web traffic on a port as tracked by SANS.

The second function, $f_2$ ($\chi$, $\zeta$), considers technology vulnerability scores (CVE and CVSS Scores) and CVE joint probabilities for technology pairing as it is related to other technologies identified in the scan. A technology can have one or more CVEs associated, and each CVE has a base score for vulnerability that ranges from 1 to 10. Higher scores imply more risk.

The third function, $f_3$ ($\xi$), is the technology appearance as reported within an exploit database (Exploit DB) containing information about the exploit. There are two aspects of this function: (1) does the CVE for a technology appear in the exploit database, and (2) how many times does a CVE appear in the database. There is no impact when no exploit database entries are found for a CVE, and there are risk penalties when there are exploit database entries. This is a penalty function for a technology with CVEs appearing on an exploit database.

The fourth function, $f_4(\Delta)$, considers the rate of Dark Mentions for a technology. There are two aspects of this function: (1) does the CVE for a technology appear in dark web mentions; and (2) how many times does a CVE appear. There is no impact when no dark web mentions entries are found for a CVE, and there are risk penalties when there are dark web mentions. This is a penalty function for a technology with CVEs appearing in dark web mentions.

The final function, $f_5(\ldots)$, that combines the four individual functions is managed by analysts such that resulting Threat Beta for technologies are reasonable and drives appropriate actions. The process of combining the four functions is done as appropriate to value for the data in the functions. Specifically, the number of ports found and CVE Score have the predominance of weight in the calculation, while exploit databases and Dark Mentions have lower impact on Threat Beta.

After executing a passive scan of an organization's internet structure, Threat Betas for each technology are calculated and presented to analysts. The calculated Threat Betas assist in prioritizing organizational efforts that are based on known vulnerabilities and the number of instances of the technology. The aggregate Threat Beta for the organization is used to estimate overall cyber event impact.

The goal of Threat Beta $\beta_i$ by technology is to trigger a call to action for the larger Threat Betas in a company's passive scan set of technologies. For example, the first technology, 'Technology A/version 1' in Table 1 below, shows a Threat Beta for 1.6 and is the highest in the list. Further investigation needs to be done to determine what's driving this score.

TABLE 1

| I | Technology/ Version | $\beta_i$ | CVE Count | Ave CVE Score | Max CVE Score | IP: Port Count | Exploit DB Entries |
|---|---|---|---|---|---|---|---|
| 1 | Technology A/ version 1 | 1.6 | 5 | 7.0 | 10.0 | 10 | 3 |
| 2 | Technology A/ version 2 | 0.9 | 1 | 5.5 | 9.0 | 1 | 1 |
| 3 | Technology B/ version 1 | 1.3 | 2 | 6.8 | 10.0 | 5 | 1 |
| 4 | Technology C | 1.0 | 1 | 5.0 | 8.5 | 1 | 0 |

An analyst looking through this report might want to explore what 10 IPs does Technology A show up on. What replacement technologies can be substituted for Technology A and other such questions in order to improve the Company cyber security posture.

Figure 10:
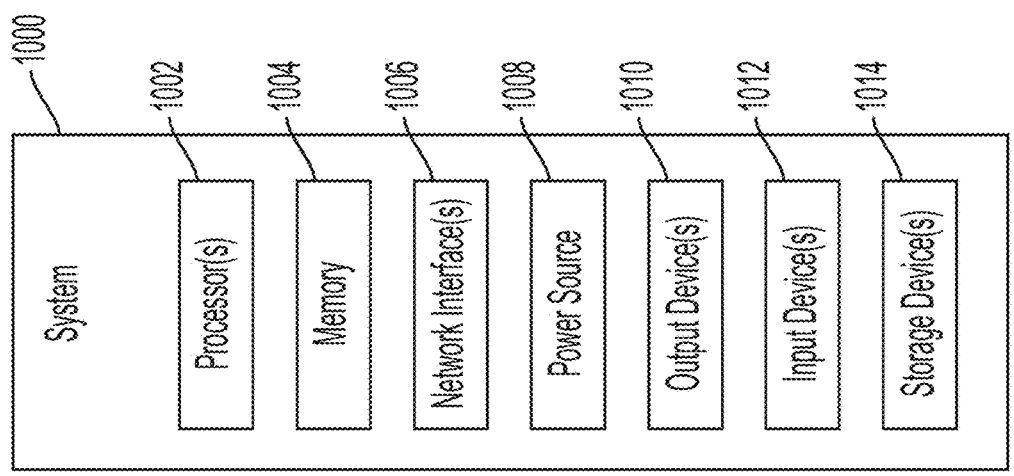
FIG. 10 illustrates a block diagram of an exemplary server system, according to an embodiment of the disclosure.

FIG. 10 illustrates a server system 1000 according to an embodiment of the disclosure. Server system 1000 may comprise one or more physical server devices or may be a cloud-based server system. Server system 1000 may implement the cyber security threat assessment system 100 of FIG. 1.

The system 1000 may include one or more processors 1002, memory 1004, network interfaces 1006, power source 1008, output devices 1010, input devices 1012, and storage devices 1014. Although not explicitly shown in FIG. 10, each component provided may be interconnected physically, communicatively, and/or operatively for inter-component communications in order to realize functionality ascribed to the various entities identified in FIG. 10. To simplify the discussion, the singular form will be used for all components identified in FIG. 10 when appropriate, but the use of the singular does not limit the discussion to only one of each component. For example, multiple processors may implement functionality attributed to processor 1002.

Processor 1002 is configured to implement functions and/or process instructions for execution within system 1000. For example, processor 1002 executes instructions stored in memory 1004 or instructions stored on a storage device 1014. In certain embodiments, instructions stored on storage device 1014 are transferred to memory 1004 for execution at processor 1002. Memory 1004, which may be a non-transient, computer-readable storage medium, is configured to store information within system 1000 during operation. In some embodiments, memory 1004 includes a temporary memory that does not retain information stored when the device 1100 is turned off. Examples of such temporary memory include volatile memories such as random access memories (RAM), dynamic random access memories (DRAM), and static random access memories (SRAM). Memory 1004 also maintains program instructions for execution by the processor 1002 and serves as a conduit for other storage devices (internal or external) coupled to system 1000 to gain access to processor 1002.

Storage device 1014 includes one or more non-transient computer-readable storage media. Storage device 1014 is provided to store larger amounts of information than memory 1004, and in some instances, configured for long-term storage of information. In some embodiments, the storage device 1014 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 1006 are used to communicate with external devices and/or other servers. The system 1000 may comprise multiple network interfaces 1006 to facilitate communication via multiple types of networks. Network interfaces 1006 may comprise network interface cards, such as Ethernet cards, optical transceivers, radio frequency transceivers, or any other type of device that can send and receive information. Non-limiting examples of network interfaces 1006 include radios compatible with several Wi-Fi standards, 3G, 4G, Long-Term Evolution (LTE), Bluetooth®, etc.

Power source 1008 provides power to system 1000. For example, system 1000 may be battery powered through rechargeable or non-rechargeable batteries utilizing nickel-cadmium or other suitable material. Power source 1008 may include a regulator for regulating power from the power grid in the case of a device plugged into a wall outlet, and in some devices, power source 1008 may utilize energy scavenging of ubiquitous radio frequency (RF) signals to provide power to system 1000.

System 1000 may also be equipped with one or more output devices 1010. Output device 1010 is configured to provide output to a user using tactile, audio, and/or video information. Examples of output device 1110 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user.

System 1000 is equipped with one or more input devices 1012. Input devices 1012 are configured to receive input from a user or the environment where device 1100 resides. In certain instances, input devices 1012 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for system 1000 are functionally and communicatively coupled to achieve certain behaviors. In some embodiments, these behaviors are controlled by software running on an operating system of system 1000.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing a holistic cyber security risk prediction metric for an enterprise network associated with an enterprise at risk from cyber security threats, the method comprising:
    identifying enterprise network parameters of the enterprise network associated with the enterprise at risk from cyber security threats;
    collecting vulnerability data associated with the enterprise network parameters, the vulnerability data comprising vulnerability scoring data and exploit severity data;
    determining one or more component cyber security threat scores based on the enterprise network parameters, the vulnerability scoring data, and the exploit severity data; and
    determining a holistic cyber security risk score for the enterprise at risk from cyber security threats based on the one or more component cyber security threat scores.

2. The method of claim 1, wherein the identifying the enterprise network parameters comprises:
    identifying a Top-Level Domain (TLD) and any associated Autonomous System Numbers (ASNs) of the enterprise network; and
    identifying enterprise network infrastructure based on the TLD and the ASNs of the enterprise network.

3. The method of claim 2, wherein the enterprise network infrastructure comprises computer Internet Protocol (IP) addresses of the enterprise network, and port numbers for each of the IP addresses.

4. The method of claim 2, wherein the collecting the enterprise network infrastructure is performed by an automated passive scanner.

5. The method of claim 3, further comprising identifying technologies running on each of the IP addresses.

6. The method of claim 3, wherein the enterprise network infrastructure further comprises hostnames and subdomains of the enterprise network.

7. The method of claim 5, wherein:
    the vulnerability data comprises published vulnerabilities and is collected for the identified technologies, and the published vulnerabilities comprises the vulnerability scoring data and the exploit severity data for each technology, the one or more component cyber security threat scores comprises a first component score, a second component score, and a third component score for each of the IP addresses, the first component score is determined based on a number of the identified technologies, a number of port numbers open on each of the IP addresses, and a number of published vulnerabilities associated with the identified technologies, the second component score is determined based on the vulnerability scoring data for each of published vulnerabilities of the technologies for each of the IP addresses, and the third component score is determined based on the exploit severity data for each of the technologies of each of the IP addresses.

8. The method of claim 7, wherein the determining the holistic cyber security risk score comprises:

determining individual IP address threat scores based on a combination of the first component score, the second component score, and the third component score for each of the IP addresses; and aggregating the individual IP address threat scores.

9. A system for providing a holistic cyber security risk prediction metric for an enterprise network associated with an enterprise at risk from cyber security threats, the system comprising:

a cyber security risk prediction server configured for:

identifying enterprise network parameters of the enterprise network associated with the enterprise at risk from cyber security threats;

collecting vulnerability data associated with the enterprise network parameters, the vulnerability data comprising vulnerability scoring data and exploit severity data;

determining one or more component cyber security threat scores based on the enterprise network parameters, the vulnerability scoring data, and the exploit severity data; and determining a holistic cyber security risk score for the enterprise at risk from cyber security threats based on the one or more component cyber security threat scores.

10. The system of claim 9, wherein the enterprise network infrastructure comprises computer Internet Protocol (IP) addresses of the enterprise network, and port numbers for each of the IP addresses.

11. The system of claim 9, wherein the collecting the enterprise network infrastructure is performed by an automated passive scanner.

12. The system of claim 10, further comprising identifying technologies running on each of the IP addresses.

13. The system of claim 10, wherein the enterprise network infrastructure further comprises hostnames and subdomains of the enterprise network.

14. The system of claim 12, wherein:

the vulnerability data comprises published vulnerabilities and is collected for the identified technologies, and the published vulnerabilities comprises the vulnerability scoring data and the exploit severity data for each technology, the one or more component cyber security threat scores comprises a first component score, a second component score, and a third component score for each of the IP addresses, the first component score is determined based on a number of the identified technologies, a number of port numbers open on each of the IP addresses, and a number of published vulnerabilities associated with the identified technologies, the second component score is determined based on the vulnerability scoring data for each of published vulnerabilities of the technologies for each of the IP addresses, and the third component score is determined based on the exploit severity data for each of the technologies of each of the IP addresses.

15. The system of claim 14, wherein the determining the holistic cyber security risk score comprises:

determining individual IP address threat scores based on a combination of the first component score, the second component score, and the third component score for each of the IP addresses; and aggregating the individual IP address threat scores.

16. A non-transitory computer-readable medium containing computer executable instructions for providing a holistic cyber security risk prediction metric for an enterprise network associated with an enterprise at risk from cyber security threats, the computer readable instructions, when executed by a computer, cause the computer to perform steps comprising:

identifying enterprise network parameters of the enterprise network associated with the enterprise at risk from cyber security threats;

collecting vulnerability data associated with the enterprise network parameters, the vulnerability data comprising vulnerability scoring data and exploit severity data;

determining one or more component cyber security threat scores based on the enterprise network parameters, the vulnerability scoring data, and the exploit severity data; and determining a holistic cyber security risk score for the enterprise at risk from cyber security threats based on the one or more component cyber security threat scores.

17. The non-transitory computer-readable medium of claim 16, wherein the identifying the enterprise network parameters comprises:

identifying a Top-Level Domain (TLD) and any associated Autonomous System Numbers (ASNs) of the enterprise network; and identifying enterprise network infrastructure based on the TLD and the ASNs of the enterprise network.

18. The non-transitory computer-readable medium of claim 17, wherein the enterprise network infrastructure comprises computer Internet Protocol (IP) addresses of the enterprise network, and port numbers for each of the IP addresses.

19. The non-transitory computer-readable medium of claim 17, wherein the collecting the enterprise network infrastructure is performed by an automated passive scanner.

20. The non-transitory computer-readable medium of claim 18, further comprising computer readable instructions to cause the computer to perform a step comprising identifying technologies running on each of the IP addresses.

21. The non-transitory computer-readable medium of claim 18, wherein the enterprise network infrastructure further comprises hostnames and subdomains of the enterprise network.

22. The non-transitory computer-readable medium of claim 20, wherein:
- the vulnerability data comprises published vulnerabilities and is collected for the identified technologies, and the published vulnerabilities comprises the vulnerability scoring data and the exploit severity data for each technology,
- the one or more component cyber security threat scores comprises a first component score, a second component score, and a third component score for each of the IP addresses,
- the first component score is determined based on a number of the identified technologies, a number of port numbers open on each of the IP addresses, and a number of published vulnerabilities associated with the identified technologies,
- the second component score is determined based on the vulnerability scoring data for each of published vulnerabilities of the technologies for each of the IP addresses, and
- the third component score is determined based on the exploit severity data for each of the technologies of each of the IP addresses.

23. The non-transitory computer-readable medium of claim 22, wherein the determining the holistic cyber security risk score comprises:
- determining individual IP address threat scores based on a combination of the first component score, the second component score, and the third component score for each of the IP addresses; and
- aggregating the individual IP address threat scores.

* * * * *